(12) United States Patent
Thornton

(10) Patent No.: US 10,613,503 B2
(45) Date of Patent: Apr. 7, 2020

(54) FRACTION COLLECTION SYSTEM WITH A TASK SCHEDULER

(71) Applicant: Bio-Rad Laboratories, Inc., Hercules, CA (US)

(72) Inventor: Kevin Thornton, Fairfield, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 211 days.

(21) Appl. No.: 15/783,218

(22) Filed: Oct. 13, 2017

(65) Prior Publication Data

US 2018/0107185 A1   Apr. 19, 2018

Related U.S. Application Data

(60) Provisional application No. 62/408,584, filed on Oct. 14, 2016.

(51) Int. Cl.
| | | |
|---|---|---|
| *G05B 19/042* | (2006.01) | |
| *G01N 35/00* | (2006.01) | |
| *G01N 30/82* | (2006.01) | |

(52) U.S. Cl.
CPC ......... *G05B 19/0426* (2013.01); *G01N 30/82* (2013.01); *G01N 35/0092* (2013.01); *G05B 19/0423* (2013.01); *G01N 35/00732* (2013.01); *G01N 2035/0091* (2013.01); *G01N 2035/0094* (2013.01); *G05B 2219/25419* (2013.01)

(58) Field of Classification Search
CPC .................................................. G01N 30/08
See application file for complete search history.

(56) References Cited

U.S. PATENT DOCUMENTS

| | | | |
|---|---|---|---|
| 5,091,092 A * | 2/1992 | Newhouse | G01N 30/24 |
| | | | 210/198.2 |
| 6,355,165 B1 | 3/2002 | Sutton et al. | |
| 6,641,783 B1 | 11/2003 | Pidgeon et al. | |
| 8,435,738 B2 | 5/2013 | Holmes | |
| 9,322,014 B1 * | 4/2016 | VanderNoot | C12N 15/101 |
| 2007/0116611 A1 * | 5/2007 | DeMarco | G01N 30/82 |
| | | | 422/400 |

(Continued)

FOREIGN PATENT DOCUMENTS

WO    WO 2004/098739 A2    11/2004

OTHER PUBLICATIONS

PCT International Search Report and Written Opinion, PCT Application No. PCT/US2017/056550, dated Jan. 25, 2018, 19 pages.

*Primary Examiner* — Matthew D Krcha
(74) *Attorney, Agent, or Firm* — Fenwick & West LLP

(57) ABSTRACT

A fraction collection system includes one or more chromatography columns. The system also includes one or more fraction collectors for collecting effluent from the columns. The fraction collectors include several racks, each holding a set of collection receptacles. A control system interfaces with the fraction collectors to implement experiments. The control system provides a user interface with which users can schedule runs. The user interface includes a graphical representation of the racks and tubes of the fraction collectors. Users can schedule runs to groups of tubes, and a visual attribute of the representation of the tube in the user interface is updated to indicate that the tubes are assigned to a run.

20 Claims, 14 Drawing Sheets

(56) References Cited

U.S. PATENT DOCUMENTS

| | | | |
|---|---|---|---|
| 2008/0229810 A1* | 9/2008 | Swart | G01N 30/20 |
| | | | 73/61.55 |
| 2008/0235081 A1* | 9/2008 | Davison | G01N 35/00732 |
| | | | 705/7.31 |
| 2012/0109529 A1* | 5/2012 | Ariyoshi | G01N 1/312 |
| | | | 702/19 |
| 2013/0018598 A1* | 1/2013 | Ohashi | G01N 30/34 |
| | | | 702/25 |
| 2013/0218352 A1 | 8/2013 | Iovanni et al. | |
| 2014/0133288 A1* | 5/2014 | Wilson | G11B 25/06 |
| | | | 369/275.3 |

* cited by examiner

FIG. 6B

FRACTION COLLECTION SYSTEM WITH A TASK SCHEDULER

CROSS REFERENCE TO RELATED APPLICATIONS

This application claims the benefit of U.S. Provisional Application No. 62/408,584, filed Oct. 14, 2016, which is incorporated by reference in its entirety.

BACKGROUND

1. Technical Field

The subject matter described generally relates to fraction collection systems, and in particular to scheduling runs in a chromatography fraction collection system.

2. Background Information

Chromatography was originally developed in the early $20^{th}$ Century as a method of separating plant pigments. Over time, additional methods have developed that apply the technique to different types of mixtures. Chromatography techniques are now used in a wide range of industries to separate useful components from a mixture.

In particular, many medical tests rely on separating target proteins from other biomolecules in a solution using a technique called "column chromatography." This technique involves passing the solution containing the target protein through a column containing a stationary phase material (e.g., by flowing the solution through a vertical column containing the stationary phase by means of a mechanical pump or gravity flow). The target protein interacts with the stationary phase in a different manner from the other components of the mixture and thus passes through the column at a different rate. Consequently, the target protein reaches the bottom of the column at a different time from the other components of the solution and can be collected.

BRIEF DESCRIPTION OF THE DRAWINGS

FIGS. 6A-6E are screen shots illustrating user interfaces for scheduling fraction collection runs, according to various embodiments.

DETAILED DESCRIPTION

Figure 1:
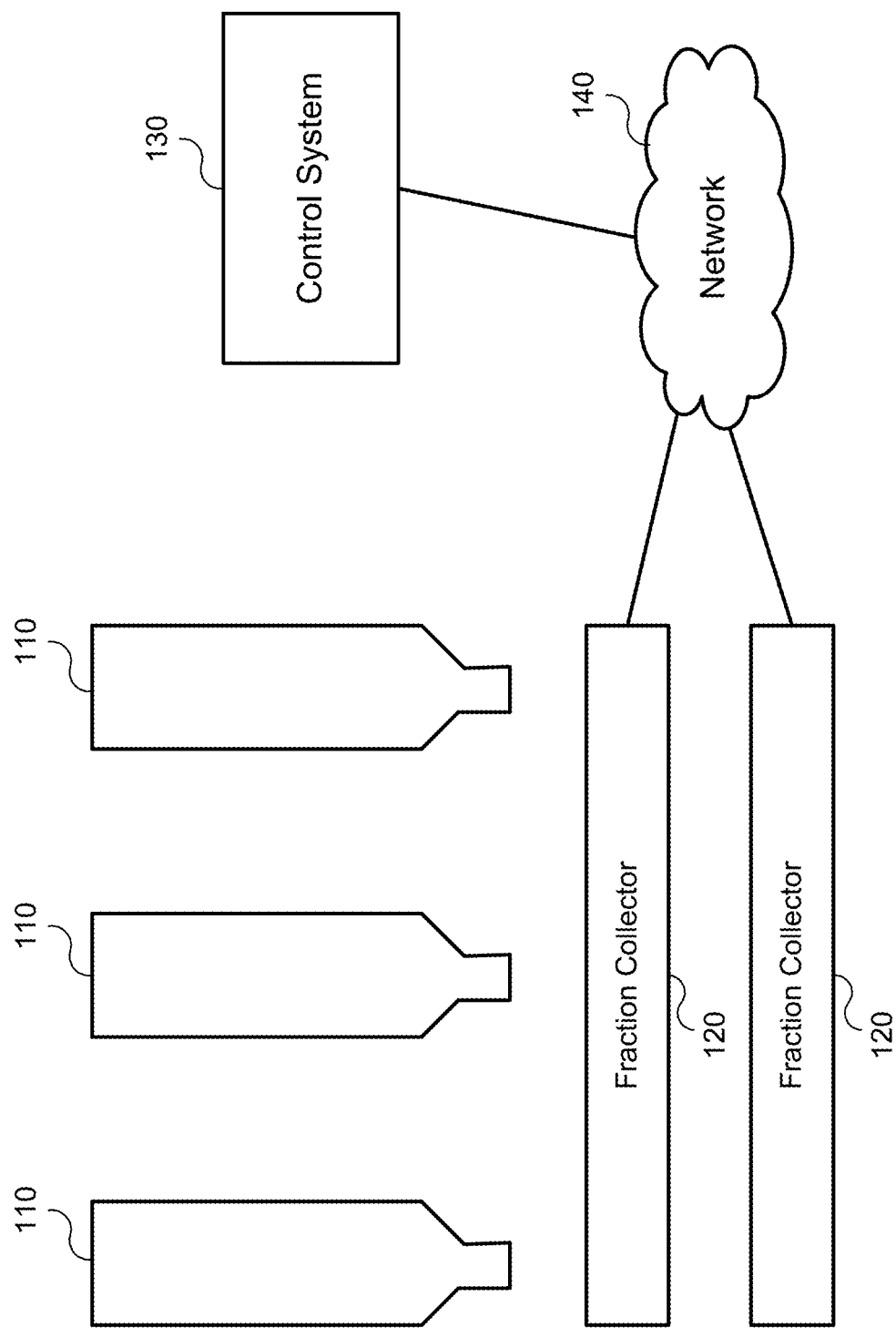
FIG. 1 is a high-level block diagram illustrating a fraction collection system, according to one embodiment.

The Figures (FIGS.) and the following description describe certain embodiments by way of illustration only. One skilled in the art will readily recognize from the following description that alternative embodiments of these structures and methods may be employed without departing from the principles described. Wherever practicable, similar or like reference numbers may be used in the figures to indicate similar or like functionality.

Overview and Benefits

Many modern medical labs include chromatography systems to identify the presence (or absence) of particular biomolecules in a solution as part of diagnostic tests. The disclosed systems and methods enable multiple users to run tests simultaneously in environments that can include several chromatography columns. Robotic devices known as a "fraction collectors" are used to gather the separated proteins or other biomolecules from the columns. Each fraction collector includes racks of tubes in which the output from the columns is collected. Each rack typically contains a particular type (e.g., size) of tube. The particular racks in a fraction collector are interchangeable, with the types of tubes being selected based on predicted or known needs of the users. Although the term "tube" is used throughout this specification to describe the collection vessels in the racks, one of skill in the art will appreciate that other types of collection vessel may also be used, such as microplates. The term "tube" should be construed to incorporate such vessels.

In various embodiments, users schedule tests using an interface on a control system. The control system dynamically predicts the number of tubes of one or more types the run will require and identifies a block of the required number of tubes that is free in one or more racks. These tubes are then provisionally reserved for the run until either the user frees them or the system dynamically reallocates them.

Users schedule runs via a graphical user interface. The interface includes a visual representation of each rack in each fraction collector and indicates the location of tubes that are assigned to runs. Thus, the user can quickly identify groups of free tubes that are large enough to be assigned to a desired run. In some instances, users can "drag and drop" their existing runs from one location to another. A provisional reservation becomes locked automatically when a run begins. In some embodiments, a user authorized for the run (e.g., the creator of the run) may also lock the reservation prior to the start of the run via the user interface. This provides an intuitive interface and enables efficient rack management, particularly in environments with multiple fraction collectors that are shared by several users.

Once a reservation has been locked, those tubes are unavailable for scheduling new runs until the corresponding user frees them. In one embodiment, users free tubes either by indicating that they have collected their tubes and replaced them in the rack (or replaced the entire rack in the slot) or by manually freeing them (e.g., by moving the run to a different set of tubes, or cancelling the run entirely). Consequently, users can have confidence that tubes containing their fractions will not be overwritten by the results of later runs until they have retrieved them. In addition, the ability to lock and unlock subsets of the tubes in a rack (in embodiments where this is available) allows greater flexibility in run scheduling. A user does not have to wait for every other user who happens to have a run scheduled in a rack to collect their results before scheduling a new run using free tubes in that rack. This increases efficiency by reducing down time for the fraction collectors.

One of skill in the art may recognize additional benefits or benefits of the disclosed system and methods based on the following description of various embodiments.

Exemplary System

FIG. 1 illustrates a fraction collection system, according to one embodiment. In the illustrated embodiment, the fraction collection system includes three chromatography columns 110, a pair of fraction collectors 120, and a control system 130 connected to the fraction collectors via a network 140. Although three columns 110 are shown, other embodiments include different numbers of columns, including one. Similarly, any number of fraction collectors 120 can be used without departing from the disclosed principles. In other embodiments, the fraction collection system contains different or additional elements. In addition, the functions may be distributed among the elements in a different manner than described herein. For example, in one embodiment, the functionally attributed to the control system 130 could be performed completely or in part by one or more computing devices incorporated into a fraction collector 120.

The chromatography columns 110 are used to separate one or more components from a solution 210. The solution 210 is inserted at or near one end of the column and the various components of the solution separate into layers (e.g., 212, 214, and 216) as the solution passes through the column. The separated solution 210 then leaves at or near the other end of the column 110 as effluent. This process is described in greater detail below, with reference to FIGS. 2A-D.

The fraction collectors 120 collect fractions of the effluent leaving the columns 110. In various embodiments, sensors of the columns 110 detect when the concentration of a component of interest reaches a threshold level, indicating that the column is ready for collection. For example, in one embodiment, an optical density sensor triggers collection when the optical density of the effluent exceeds or drops under a threshold. One of skill in the art will recognize how to determine an appropriate threshold for a given component of interest. In other embodiments, other types of sensor are used. Alternatively, a previously determined or estimated time for the component to reach the bottom of the column 110 may be used to trigger fraction collection. Embodiments of the fraction collectors 120 are described in greater detail below, with reference to FIG. 3.

The control system 130 provides a user interface with which users can schedule runs. In various embodiments, the user interface provided by the control system 130 includes a graphical representation of all of the tubes in each rack of each fraction collector 120. The graphical representation indicates which tubes are currently reserved for other runs and which are available for run scheduling. The user interface also includes controls enabling the user to have tubes automatically assigned for a new run or select a set of available tubes for the run automatically. In one such embodiment, the user interface also allows the user to move previously scheduled runs over which the user has control to a different set of tubes. Embodiments of the control system 140 are described in greater detail below, with reference to FIG. 4.

The network 140 provides a communication link between the fraction collectors 120 and the control system 130. In one embodiment, the network 140 uses standard communications technologies and protocols, such as the Internet. Thus, the network 140 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 140 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 140 can be represented using technologies and formats including image data in binary form (e.g., Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In other embodiments, the entities on the network 140 uses custom or dedicated data communications technologies instead of, or in addition to, the ones described above.

Chromatography Columns

Figure 2D:
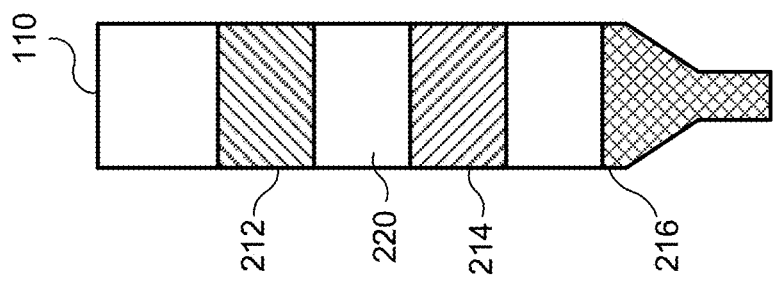
FIGS. 2A-2D illustrate the separation of a component of interest from a solution, according to one embodiment.
Figure 2C:
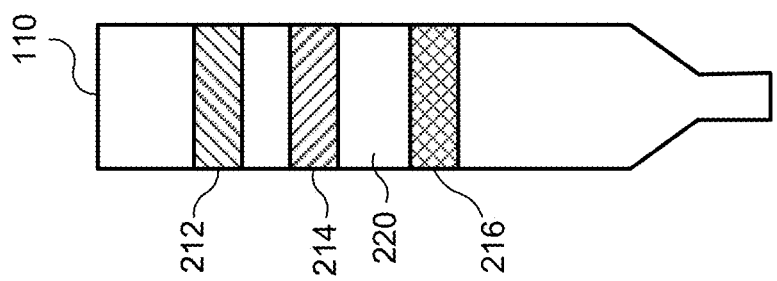
Figure 2B:
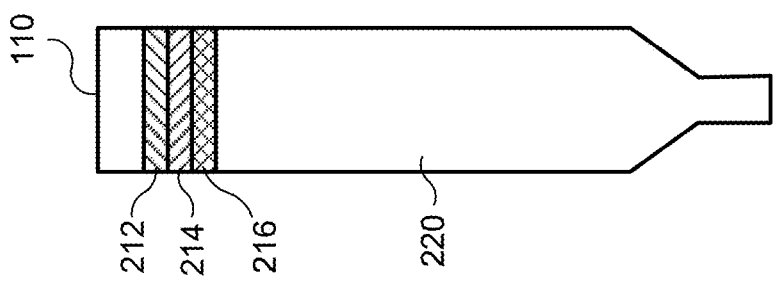
Figure 2A:
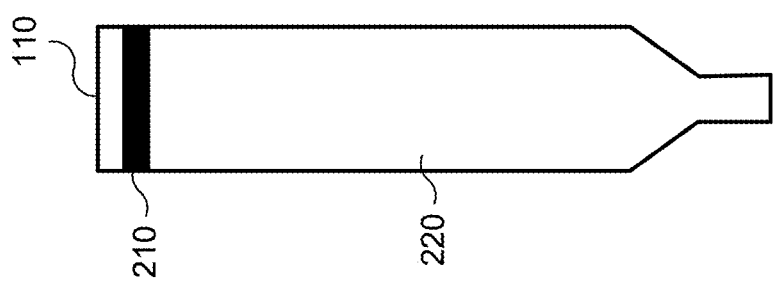

FIGS. 2A-D illustrate the operation of the chromatography columns 110, according to one embodiment. In FIG. 2A, the solution 210 is inserted (e.g., injected) at or near the top of the column 110. The column 110 is substantially full with a stationary phase material 220. In one embodiment, the stationary phase material 220 is a chemically modified matrix that interacts with a target biomolecule differently than other molecules in the solution 210. Examples of such stationary phase materials include immobilized metal affinity chromatography (IMAC) resin, glutathione-agarose resin, protein A resin, and the like.

In FIG. 2B, the solution 210 has started to pass through the stationary phase material 210 in the column 110. Typically, the solution 210 is pulled through the stationary phase material 220 by gravity, but a pump (not shown) may also be used. Because of the different reactions between the components of the solution 210 and the stationary phase material 220, it begins to separate into layers 212, 214 & 216, with each layer including a different component. Although three layers 212, 214 & 216 are shown, different solution 210 and stationary phase material 220 combinations will result in different numbers of layers.

FIG. 2C illustrates the column 110 at a later time. Due to the different rates at which the components pass through the stationary phase material 220, the layers 212, 214 & 216 have continued to separate. The layers 212, 214 & 216 also become wider as they pass through the column. Although FIG. 2C shows the layers 212, 214 & 216 as physically separate, in some instances the layers may remain partially overlapping. Similarly, although the layers 212, 214 & 216 are shown as having hard edges, in many instances the concentration of the component will typically decrease from the center of the layer towards the edge. Thus, the edge of a layer 212, 214 or 216 can be viewed as the point at which the concentration of the corresponding component of the original solution 210 drops below a certain threshold.

FIG. 2D illustrates the column 110 at an even later time. The layers 212, 214 & 216 have continued to broaden and separate, and the first layer 216 has reached the end of the column. Thus, the effluent leaving the end of the column 110 contains a substantial amount of the component of the solution 210 corresponding to the first layer 216. Similarly, and yet later times, when the other layers 212 & 214 reach the end of the column 110, the effluent will contain substantial amount of the components of the solution 210 corresponding to those layers.

Fraction Collectors

Figure 3:
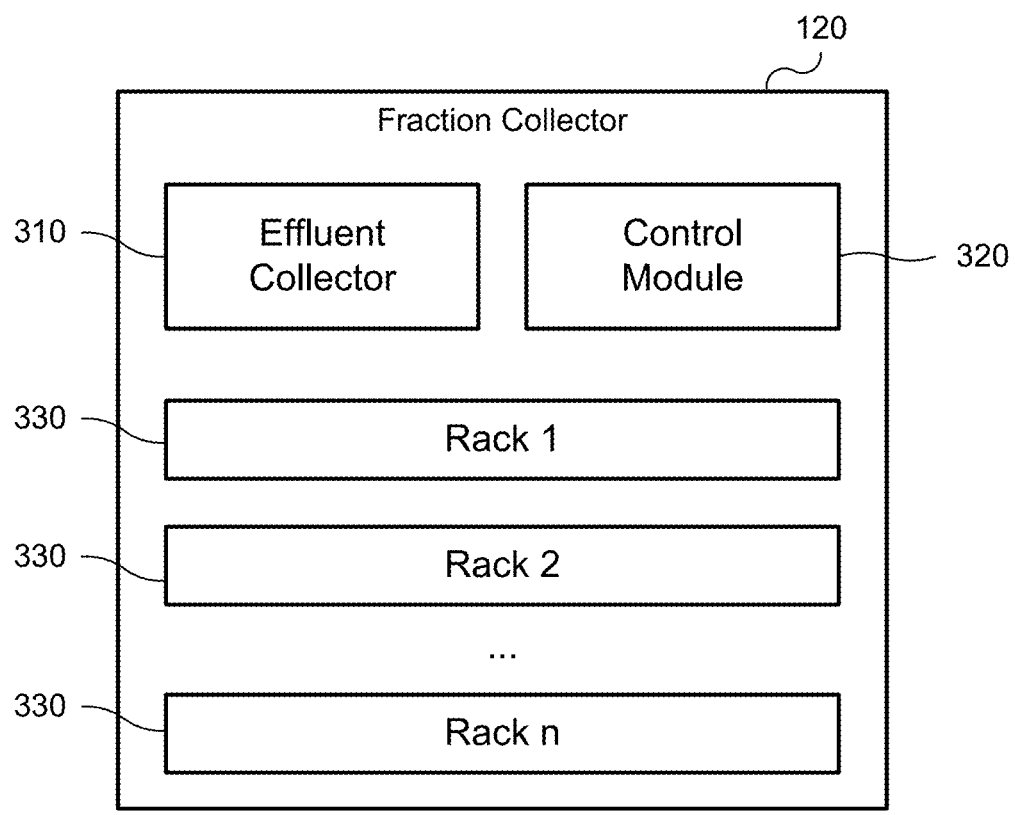
FIG. 3 is a high-level block diagram illustrating a fraction collector suitable for use in the system of FIG. 1, according to one embodiment.

FIG. 3 illustrates an example a fraction collector 120, according to one embodiment. In the illustrated embodiment, the fraction collector 120 includes an effluent collector 310, a control module 320, and several racks 330. In other embodiments, the fraction collector 120 includes different or additional elements. In addition, the functions may be distributed among the elements in a different manner than described herein. For example, the fraction collector 120 may include software modules, circuits, or displays for performing self-diagnostics and reporting potential errors and other problems.

The effluent collector 310 interfaces with a column 110 to collect a portion (or "fraction") of the effluent leaving the column and directs it to a tube in one of the racks 330. In one embodiment, two valves on the effluent collector 310 interface with the column 110 by means of a flexible pipe. These valves allow the effluent to be directed to waste, if it is an impurity, or dispensed to a tube, if it is a desired component. During tube-to-tube movements the valves allow effluent to be directed to waste, or accumulated into a loop and dispensed when the movement is complete.

The control module 320 interacts with the control system 130 and directs the activity of the fraction collector 120. In various embodiments, the control module 320 receives instructions regarding which column 110 to collect effluent from and the tube to which is should be directed. In response to receiving an instruction, and the control module 320 couples the identified column 110 and tube with the effluent collector 310. In one such embodiment, the instructions also include a duration or volume of collection, and the control module 320 maintains the coupling between the column 110 and tube until the condition is met. In another embodiment, the column 110 and tube remain coupled until the control module 320 receives a new instruction from the control system 130. One of skill in the art will recognize various ways in which the control module 320 and control system 130 can interact to implement the runs requested by users.

The racks 330 hold the tubes in which the fractions are collected. Racks typically hold tubes of a particular size and type (e.g., 13-mm tubes), although some racks are configured to hold more than one type. In various embodiments, the racks 330 are mounted in slots in the fraction collector 120. Thus, a rack 330 can be removed and replaced with one holding a different size or type of tube. This enables the fraction collector 120 to be customized to suit the current needs to users. In one embodiment, each fraction collector 120 has slots for four racks 330. Although FIG. 3 shows the fraction collector 120 as having multiple racks 330, in some embodiments, the fraction collector has a single rack slot.

Control System

Figure 4:
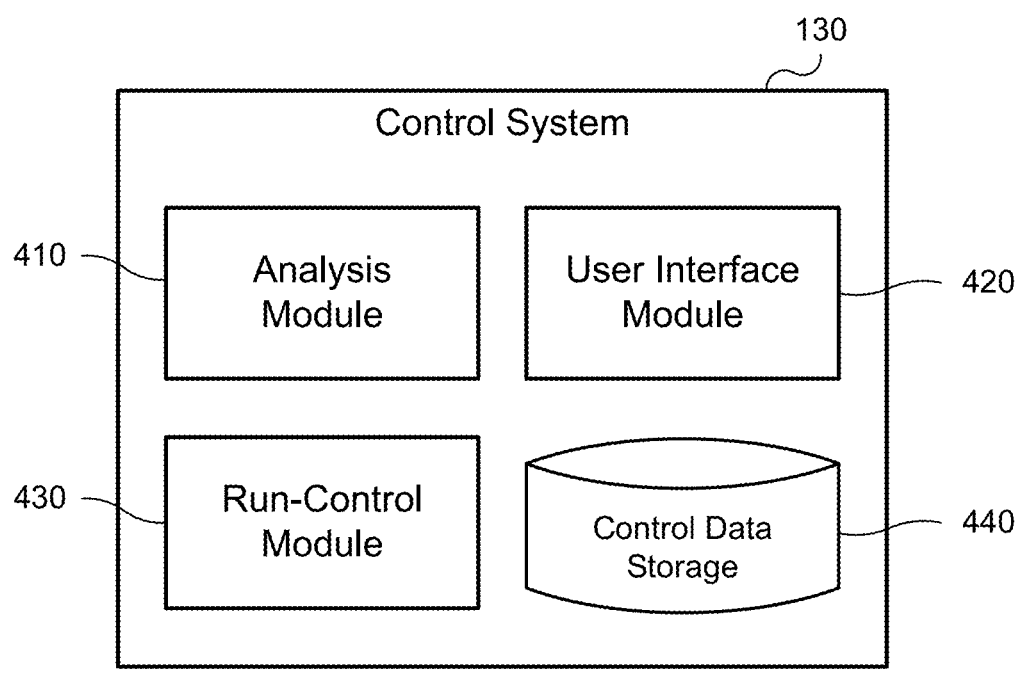
FIG. 4 is a high-level block diagram illustrating one embodiment of the control system shown in FIG. 1.

FIG. 4 illustrates an example control system 140, according to one embodiment. In the embodiment shown, the control system 140 includes an analysis module 410, a user interface module 420, a run-control module 430, and control data storage 440. In other embodiments, the control system 140 includes different or additional elements. In addition, the functions may be distributed among the elements in a different manner than described herein. For example, the functionality attributed to the control system 140 may be distributed between more than one computing device. As another example, some of the functionality may be performed by one or more of the fraction collectors 120.

The analysis module 410 identifies tubes that are available for run scheduling. In various embodiments, the analysis module 410 assigns one of three statuses to each tube: available, reserved but floating, or reserved and locked. Available tubes are those for which no run has been assigned and thus are available to be assigned to a new run. Tubes identified as reserved but floating have a run assigned to them, but may have their assigned run changed if a preceding run uses more or less than its allocated fraction collector space. Tubes that are reserved and locked have a run assigned to them, and that run cannot be moved. In one embodiment, tubes become reserved and locked when the corresponding run begins or when a user with control of the run requests the assigned tubes to be locked. Thus, a run that has begun cannot be disrupted by another request causing the tubes to be reassigned mid-run, and users can control exactly which tubes their runs use. In another embodiment, tubes only become locked once the corresponding run has begun.

In one embodiment, the analysis module 410 uses layers corresponding to available tube types. Each available type of tube (including blank racks if they are available) has a layer. The layer for a tube type includes an availability indicator for every possible tube of that type (i.e., if every slot in the fraction collectors 120 had a rack filled with tubes of that type). For slots filled with racks of a different type of tube than that represented by the layer, every potential tube in that rack is marked as unavailable. This may be achieved by marking the tubes as reserved and locked, or there may a separate status identifier for unavailable tubes. The availability of tubes can be indicated with an individual flag for each tube, or groups of contiguous tubes with like statuses can be stored. Various methods for identifying and updating tube groupings are described in greater detail below, with reference to FIGS. 8-11.

Figure 5:
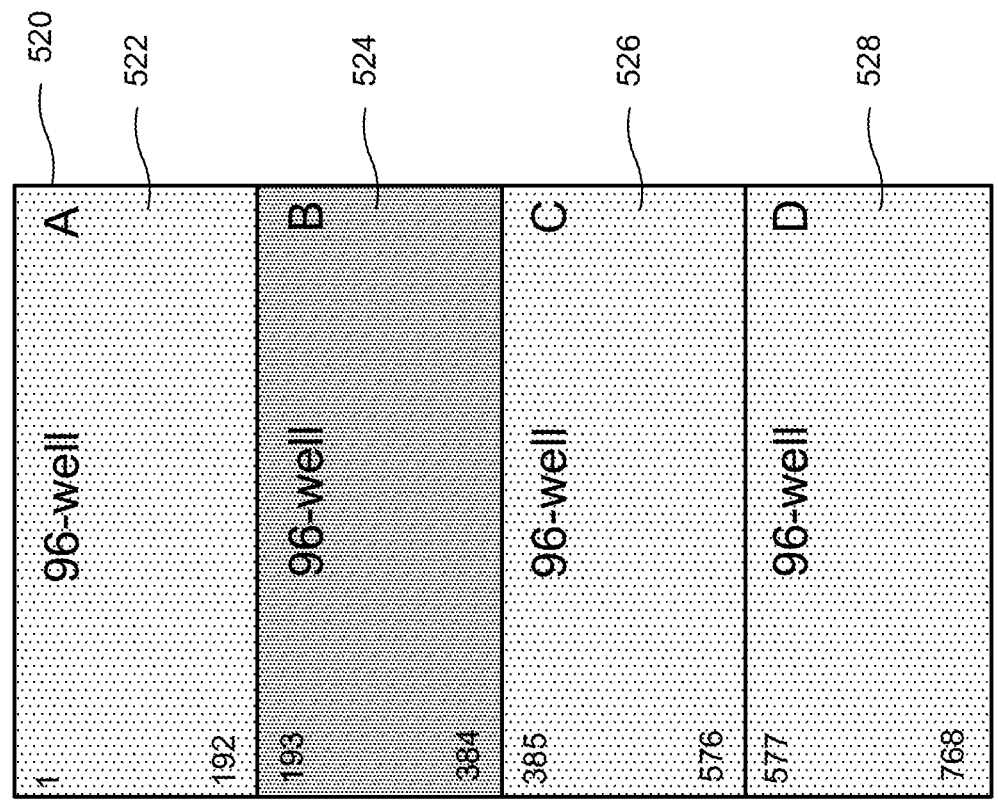
FIG. 5 illustrates layers suitable for use in scheduling fraction collection runs in a system with more than one type of rack, according to one embodiment.
Figure 5:
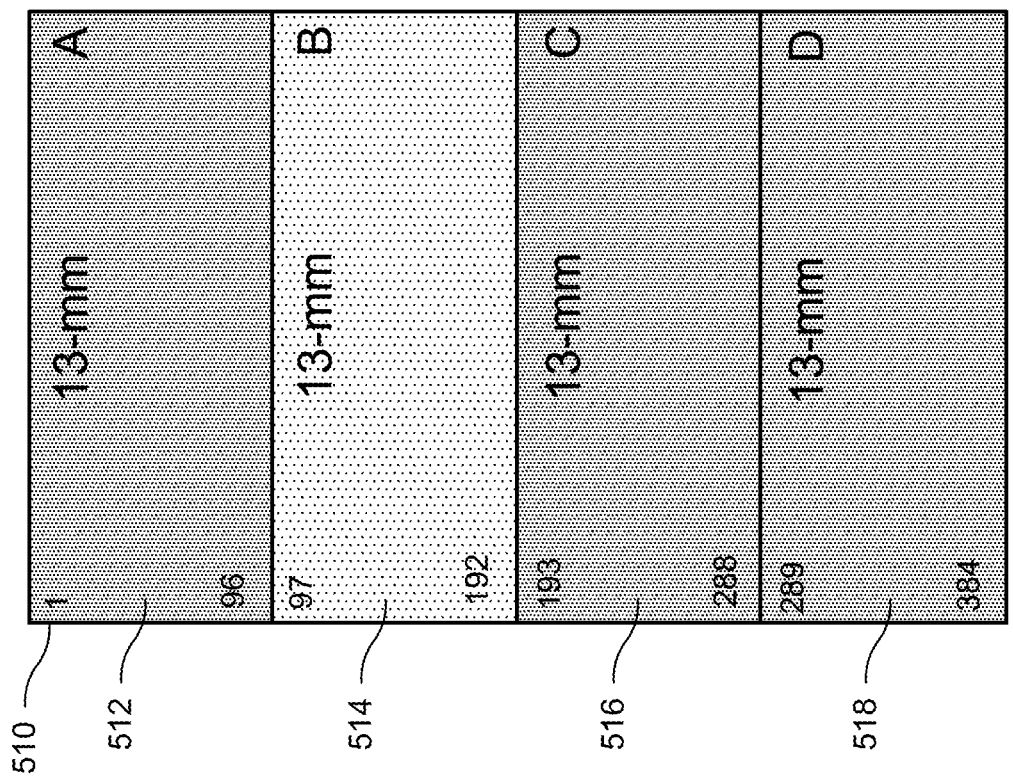

FIG. 5 illustrates an example of two layers 510 and 520, according to one embodiment. The first layer 510 is for 13-mm tubes and the second layer 520 is of the 96-well type. The layers 510 and 520 are for a single fraction collector 120 with four rack slots, labelled A through D. Slots A, C, and D currently include 13-mm tube racks, while slot B holds a 96-well rack. Consequently, in the first layer 510, the sections corresponding racks A, C, and D 512, 516, and 518 are available. However, the section corresponding to rack B 514 is unavailable. Conversely, in the second layer 520, only the section corresponding to rack B 524 is available, with the other sections 522, 526, and 528 being unavailable. Within the sections that are available, some of the tubes are still unavailable due to scheduled runs. For example, the section of the first layer 510 for rack A 512 has three runs scheduled, making the indicated tubes unavailable.

In systems where more than one fraction collector 120 is used, the layers can span all of the fraction collectors. For example, if there are two fraction collectors 120, each with four rack slots, the layer for each tube type will include eight racks; four for the first fraction collector and four for the second. Thus, multiple fraction collectors 120 can be treated as a single, large fraction collector, with the scheduling analysis focusing instead on the required tube types. Among other advantages, this allows for efficient searching for available tubes and flexible scheduling of runs.

Referring back to FIG. 4, the user interface module 420 provides an interface enabling users to schedule runs in the fraction collection system. In various embodiments, the user provides information about the run to be scheduled, such as the input solution, the molecule or molecules to be collected, the type or types of tube required for collection, and the like. In some instances, this information may be provided as a pre-determined run-type (e.g., by selecting a file including the required parameters).

In some embodiments, the user interface module 420 uses the information about the run to predict the number of tubes that will be required. For some experiments, the number of required tubes is a known value in the system (e.g., a common experiment that has been run many times for which the required number of tubes has been saved). Thus, the prediction is guaranteed to be accurate absent an unexpected event. In other cases, the prediction is an estimate based on known parameters, such as the volume of input solution, the amount of the target bio-molecule expected to be present, results of similar previous experiments, and the like. For example, if the run is set to continue until the concentration of the molecule of interest in the effluent drops below a threshold, the precise number of tubes required is not known until the experiment is run. In one embodiment, the user interface module 420 also provides controls to enable users to override the predicted number of tubes and provide their own values. For example, if a user has run the experiment before and found the prediction to overestimate the required number of tubes, the user can manually enter a lower number to prevent an excessive number of tubes being reserved unnecessarily. In addition, if the experiment contains hold steps and the user knows the prediction underestimates the number of tubes required, they can manually enter a higher number of tubes to prevent running out of tubes.

Once the predicted or actual number of tubes required (and the required tube type) is determined, the user interface module 420 presents a graphical representation of the tubes of the required type that are available for run scheduling. In one embodiment, the user interface module 420 provides controls enabling the user to select a set of tubes from those available for the run. In another embodiment, the user interface module 420 initially identifies an appropriate set of tubes (e.g., the first group of tubes after the current run that is large enough) and provides controls to enable the user to confirm and lock the identified group, select another group (either floating or locked), or leave the run floating. If the allocation is left floating, then the control system 130 can later allocate the run to a different group of tubes (e.g., to more efficiently schedule runs, or make space for a larger run). In a further embodiment, all allocations are considered floating until the corresponding run has begun.

In some embodiments, the user interface module 420 provides controls for selecting between different methods of automatic tube assignment. In particular, the user interface module 420 enables selection between four modes of automatic assignment: next free tube, next free tube plus one, next free row, or next free rack. In the next free tube mode, the user interface module 420 assigns the run to the next contiguous run of free tubes of at least the required size, with the assignment starting in the first free tube of the run. The next free tube plus one mode is similar, except that the user interface module leaves a single "spacer" tube unassigned between the previously assigned run and the new run. In the next free row mode, the user interface module 420 assigns the run to a contiguous run of available tubes that begins with the first tube in a row of a rack. Similarly, in the next free rack mode, the user interface module 420 assigns a run of contiguous tubes beginning with the first tube in a rack.

If a contiguous group with the required properties is unavailable, the user interface module 420 returns an error. In one embodiment, the user interface module 420 first addresses such an error by attempting to reassign other runs (consistent with the required properties for those run assignments) to create a contiguous group of tubes with the requested properties. For example, if a next free row type run is assigned to the first row in a rack when a request for a run to be assigned to the next free rack is received, the user interface module 420 might reassign the earlier run to a later row in the rack (assuming one is free) so that the new run can be scheduled in the first row. If a contiguous run of tubes with the required properties still cannot be identified, the error is reported to the user. In another embodiment, the user interface module 420 just reports the error to the user, at which point the user can attempt to reassign runs manually to make room for the new run, or wait until space is freed up by the completion of existing runs.

FIGS. 6A-E illustrate user interfaces for assigning tubes to a run, according to various embodiments. In the embodiment shown in FIG. 6A, the user interface is split into two main areas: a run scheduling section 610 and a tube visualization section 680. The user interface also includes a set of controls at the bottom including a help button 662, a schedule run button 664, a start run button 666, a cancel button 668, a check box for starting runs with an empty tray 772, and a configure tray button 774. In other embodiments, the user interface includes different or additional elements. Furthermore, the elements may be arranged in a different manner than that shown in FIG. 6A. For example, in some embodiments, a separate area including information about the run being scheduled is included. The particular embodiment shown is described by way of example only.

The run scheduling section 610 includes a drop down menu 612 for selecting a fraction collection system (in this case, identified by the name VirtualNGC). This drop down 612 enables a user to schedule runs in more than one fraction collection system using a single control system 130. For example, the control system 130 might be a desktop computer in a laboratory that connects with the fraction collection system via the Internet. Thus, the user can schedule runs from any computing device that has Internet access. The run scheduling section 610 also includes boxes 614 and 616, which enable the user to select a pre-existing method (or provide a name for a new method) and name the current instance of the method (i.e., the run being scheduled), respectively. There is also an area 618 in which to record comments/notes.

Below the notes area 618 are a check box 642 for enabling multiple run mode and a control 644 for selecting the number of runs. The run scheduling section 610 also includes a pair of radio buttons 652 and 654 that let the user select whether collected fractions will be appended or overlaid to previous ones. This is followed by a fraction placement table 632 that identifies the rack(s) and starting location(s) provisionally assigned to the run. The fraction placement table 632 also indicates the predicted number of tubes required and the maximum amount that will be collected. For example, in the instance shown, the top row of the table 632 indicates the user interface module 420 has estimated that 4 tubes will be required and has assigned a block starting at OV1/3 and ending at OV1/6. In one embodiment the tables estimated count can be increased or decreased by the user to produce a more accurate estimate. This is necessary for runs that use threshold and hold steps where tube requirements are best predicted based on user experience. The table 632 also indicates that the corresponding maximum size is 150 ml. In embodiments that allow user controlled tube locking, the run scheduling section 610 can also include controls for this purpose, such as a pair of radio buttons for switching between the assigned tubes being locked or floating.

Figure 6A:
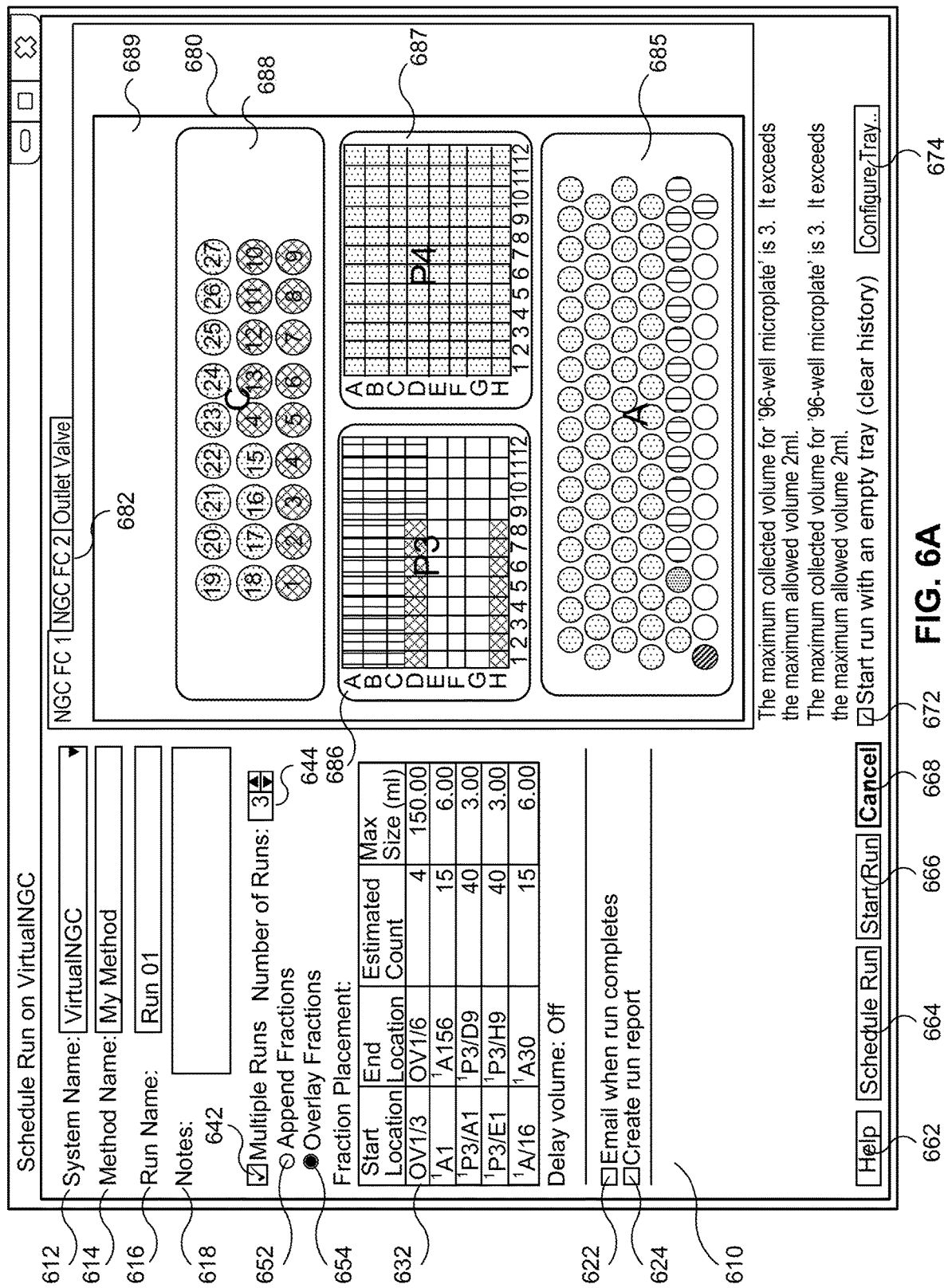

In FIG. 6A, the user has selected the multi-run checkbox 642 and used control 644 to set the number of runs to 3. Consequently, the corresponding information is now visible in the fraction placement table 632 for configuring the multi-run experiment. In some embodiments, control 644 and radio buttons 652 and 654 are hidden from view if the multi-run checkbox 642 is not checked. As noted above, the radio buttons 652 and 654 allow users to select between appending or overlaying fractions into tubes that have already been used. In this case, overlay has been selected and the fraction placement table 632 indicates the destination for the overlay (rack A and plate P3) and the total amount of effluent that will be in each tube as a result of the overlay. A visual indicator is provided if this amount is greater than the capacity of the tubes (in this case, by displaying the number in the fraction placement table 632 in red and displaying a warning message at the bottom of the dialog box). In one embodiment, users are prevented from starting the run until the method has been corrected such that the tube capacity is not exceeded, thus preventing tube overflow and loss of sample.

Below the fraction placement table 632 are a pair of check boxes for requesting a notification email and a run report. The notification email is sent to an address provided by the user when the run completes to notify him or her that the results (i.e., the group of tubes used) are ready for collection. If requested, the run report provides information about the run, such as the number of tubes actually used versus the number allocated, any unexpected occurrences or problems, the start and end times of the run, and the like.

The tube visualization section 680 displays a visual representation of the tubes available in the fraction collectors 120. In the embodiment shown in FIG. 6A, a series of tabs 682 are provided to change the display between the available collectors. In the case shown, there are tabs 682 for two fraction collectors (NGC FC 1 and NGC FC 2) and one outlet valve used for collecting samples. When the outlet valve tab is selected, a graphical representation of the valve and its ports are displayed (as opposed to the rack and tube representations displayed when a fraction collector tab is selected). In other embodiments, the visual representations of each fraction collector 120 are displayed simultaneously (e.g., side by side).

In various embodiments, the visual representation of a fraction collector 120 includes a geometric shape representing each rack (in FIG. 6A, substantially a rectangle, but with rounded corners). Note that in the embodiment shown, the first and third slots contain tube racks of two different sizes. Consequently, the bottom portion of the tube visualization section 680 includes a first geometric shape 685 representing the first rack, labelled A, and a portion three-quarters of the way up includes a second geometric shape 688, labelled C. However, the second rack slot contains two separate half racks of the 96-well type. For convenience, these are labeled P3 and P4 to distinguish them from full racks and are represented by geometric shapes 686 and 687, respectively. In one embodiment, the first slot contains either a full tack labelled A or a pair of half racks labelled P1 and P2, while the second contains either a full rack labelled B or half racks labelled P3 and P4 (as shown), etc. Thus, the rack label uniquely identifies the size (full or half) and location of the rack. The selected fraction collector 120 (NGC FC 1) has room for a fourth rack, but one is not currently installed. Consequently, the tube visualization section 680 includes a blank space 689 at the top indicating that there is space for an additional rack to be installed.

Each rack representation 685, 686, 687, 688, and 689 encompasses additional geometric shapes corresponding to each tube (in FIG. 6A, circles for the tubes of racks A and C, and squares for the 96-well receptacles of racks P3 and P4). The representations of the tubes can be numbered to indicate the order in which the fraction collector 120 will fill them or to indicate their grid location in the rack. Furthermore, the representations of the tubes are color coded to indicate the status of the corresponding tube. In the embodiment shown, the predicted first tube of the run being scheduled is shaded in one color (e.g., green) and the predicted last tube is displayed in another color (e.g., red). Tube segments corresponding to rows in the fraction placement table alternate between two shades of a color (e.g. light and dark blue). In some embodiments, groups can span adjacent racks of the same type. In other words, unassigned tubes from the ends of adjacent racks can be treated as a single, unassigned group. In the embodiment shown in FIG. 6A, all tubes in racks from previously scheduled runs, such as Rack C, are colored a fifth color (light yellow). Rack P4 is a 96-well plate with no tubes currently assigned. The empty slot at Rack position D currently has no rack assigned and is available for assignment. In embodiments where tube locking is available, the tube representations can be a different color if the user has elected to lock the tubes for the run. One of skill in the art will recognize that other visual distinguishers may be used either individually or in combination, such as fill patterns, outlining, changes in shape, and the like.

User selection of the help button 662 causes display of information explaining how the user interface operates. User selection of the schedule run button 664 confirms the provisional assignments for the run currently displayed in the tube visualization section 680. Consequently, the fraction collector(s) 120 will begin collection into the identified tubes once the sensors on the column(s) 110 indicate the required condition(s) (e.g., the optical density of the effluent being above or below a pre-set threshold). User selection of the start run button 666 causes the run to be added to the run queue and for the queue to start running immediately. This can be useful, for example, where the user knows the column 110 is ready for collection. Finally, user selection of the cancel button 668 closes the run scheduling window without assigning any tubes. When a user checks the "Start Run with Empty Tray" check box 672, this indicates that all previous run tubes have been removed and it is safe to reschedule the fraction collector tray. This is described in greater detail below with reference to FIG. 6E. User selection of the configure tray button 674 opens an additional window that includes controls for configuring the trays of the fraction collectors 120 (e.g., assigning new racks). This is described in greater detail below with reference to FIGS. 6C and 6D.

Figure 6B:
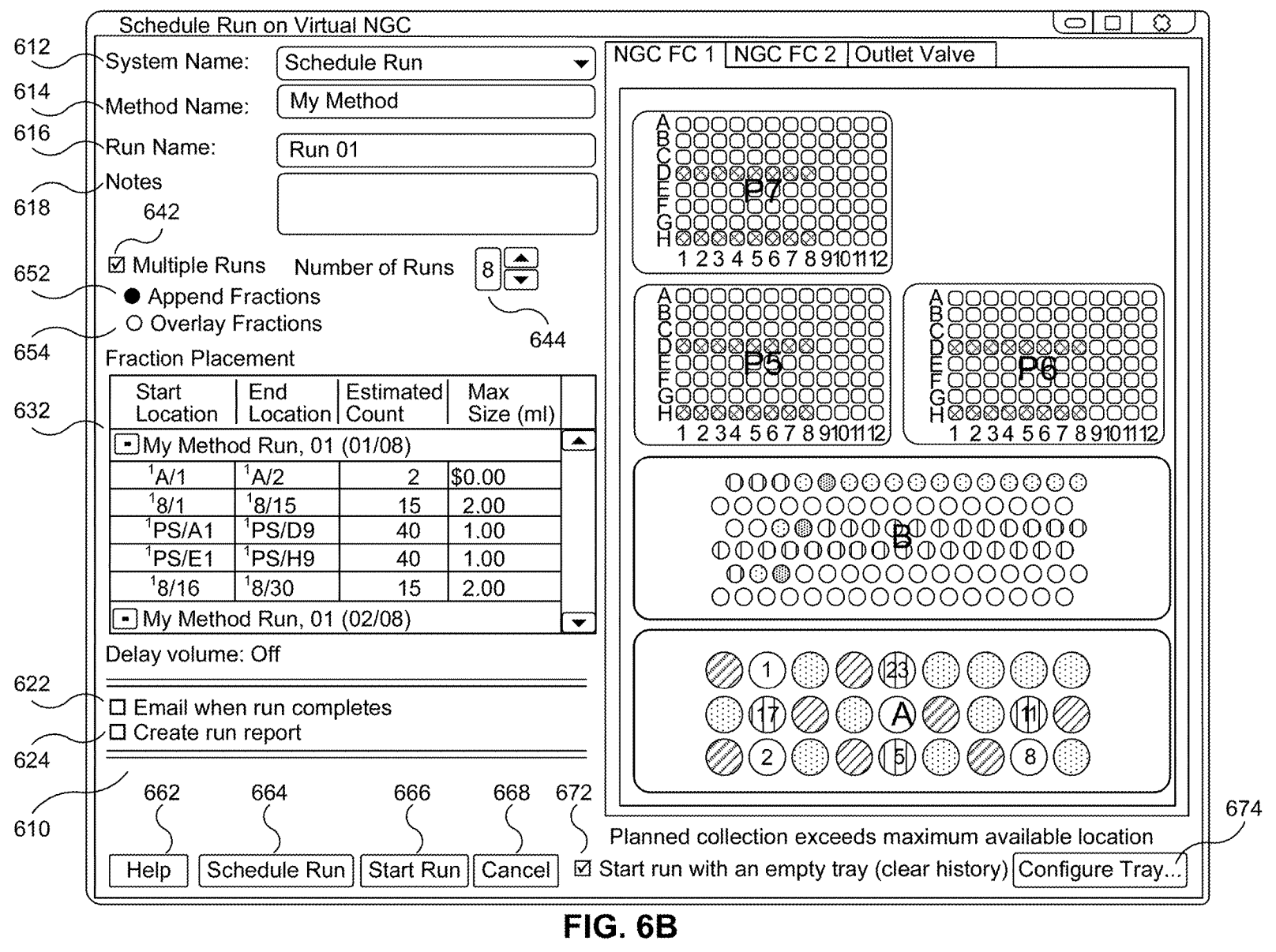

In the embodiment depicted in FIG. 6B, the user has selected the append fractions multi-run configuration using radio button 654. The fraction placement table 632 indicates the destination racks for the append operation (in this case, Racks A, B, and P5-P7). The rack placement is determined automatically based on the number of runs selected by the user. In one embodiment a new block of fraction placement parameters are added to the fraction placement table 632 for each run in the multi-run. In one embodiment a visual indicator is provided if the number of runs selected require more racks than the fraction collector capacity. In this case the multi-run must be corrected before it can be started, thus preventing the multi-run from running out of tubes in the middle of a run. In the embodiment shown, there is more information in the fraction placement table 632 than can be displayed at one time, so it includes a vertical scroll bar to allow the user to scroll through the information.

Figure 6C:
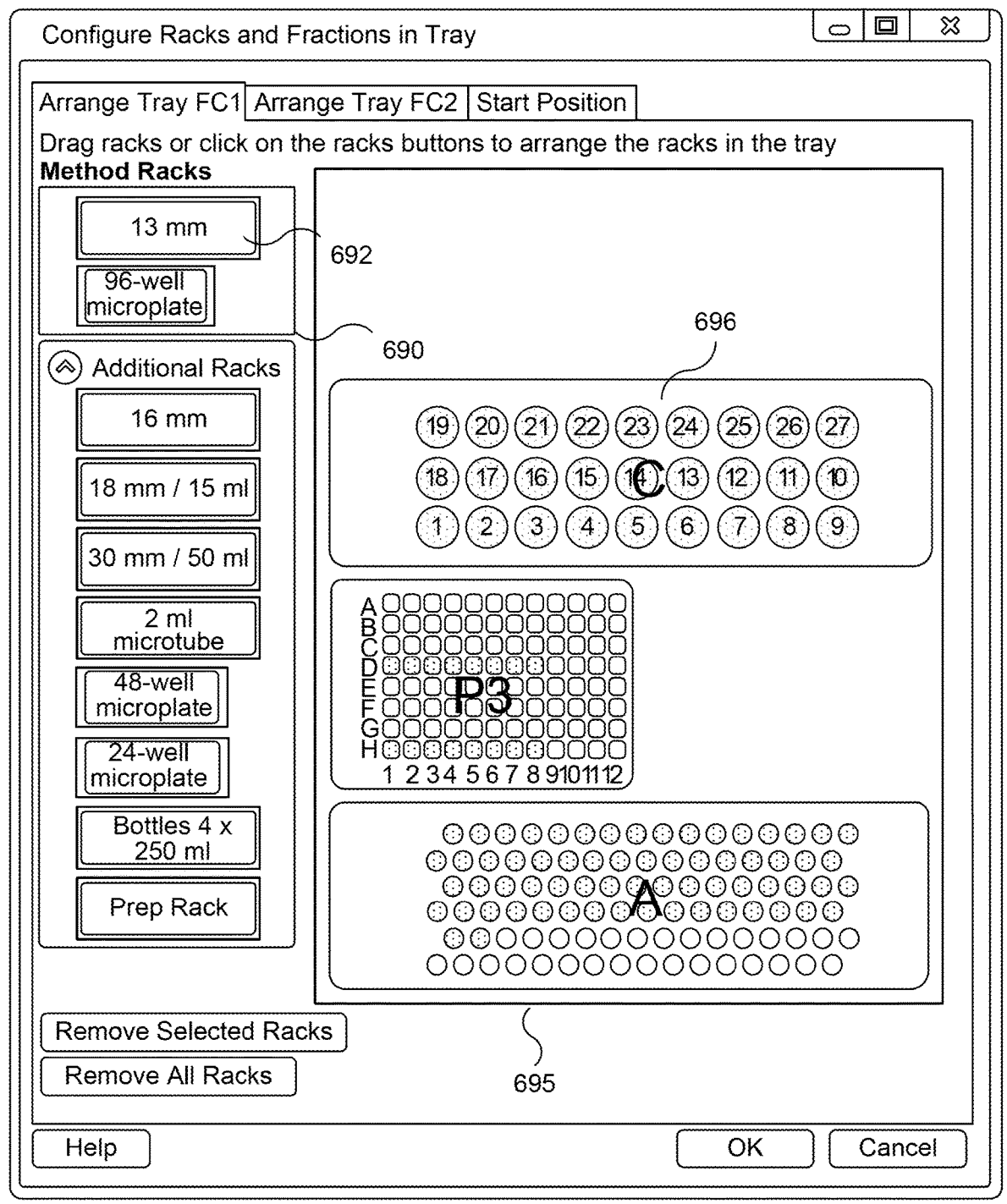

FIG. 6C shows an embodiment of a user interface for assigning racks to a fraction collector 120. In the embodiment shown, the user has opened the interface for assigning the racks (e.g., by selecting the "Configure Tray" button 674 within the run scheduling interface). Rack order within the fraction collector can be determined automatically based on the method's predetermined fraction collection order. Racks may also be located manually, in which case the fraction collection plan will automatically adapt to the rack placement. The rack assignment interface includes a rack template area 690 and an assigned racks area 695. The rack template area 690 includes visual representations of the types of racks that may be assigned to the fraction collector 120. In the embodiment shown, the rack template area 690 is split into two parts. The first includes the templates for rack types that are used by the currently selected method and the second contains other available rack templates. To assign a rack to the fraction collector 120, the user drags a rack template (e.g. the 13-mm rack template 692) from the rack template area 690 to the assigned racks area 695. This makes it visually apparent which rack type is being selected and is language independent. In addition, previously assigned racks (e.g., rack C 696) can be dragged to different locations within the assigned racks area 695 to reorder the assigned racks. Thus, the interface allows users to place racks of a desired type at a desired location. Those skilled in the art will also recognize that identification of manually place racks and their location could also be automated through the use of RFID tags, barcodes, or other tags that can be read by computer based scanners.

Figure 6D:
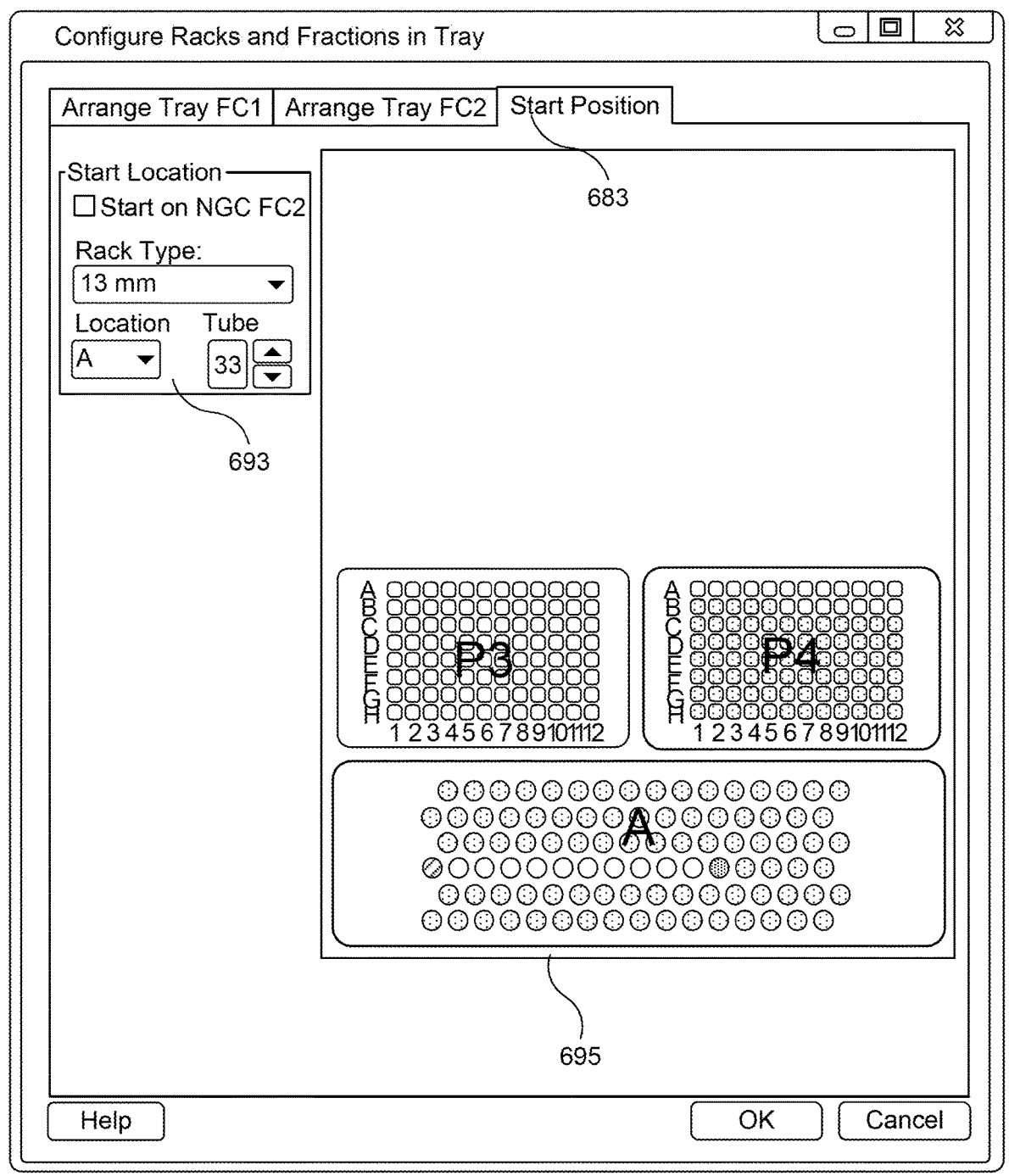

FIG. 6D shows one embodiment of a user interface for reassigning the start location for tubes in a fraction collector rack. In the embodiment shown, the user has opened the interface for assigning racks (e.g., by selecting a "Configure Tray" button 674 within the run scheduling interface) and selected the start position tab 683. The position of the starting tube within the racks can be determined automatically based on user set criteria in the methods. The start tube's position may be changed manually by the user. In various embodiments, this can be done by entering new rack and tube position values using the start location controls 693 or using a mouse to drag the visual representation of the start tube in the assigned racks area 695 to a new location. This latter option makes it visually obvious where the start tube is being placed and is language independent. One of skill in the art may recognize other methods that may be used to identify a new start tube.

One skilled in the arts will appreciate the need to balance high throughput against the concern of one run interfering with another. In the embodiments described in FIGS. 6A-D, the tubes are automatically or manually scheduled and the rack space managed such that each scheduled run is ensured adequate space and that no run uses space reserved for another run. One skilled in the art will also appreciate the need to unschedule these runs once they are completed so that additional runs may be scheduled at the locations they occupy.

Figure 6E:
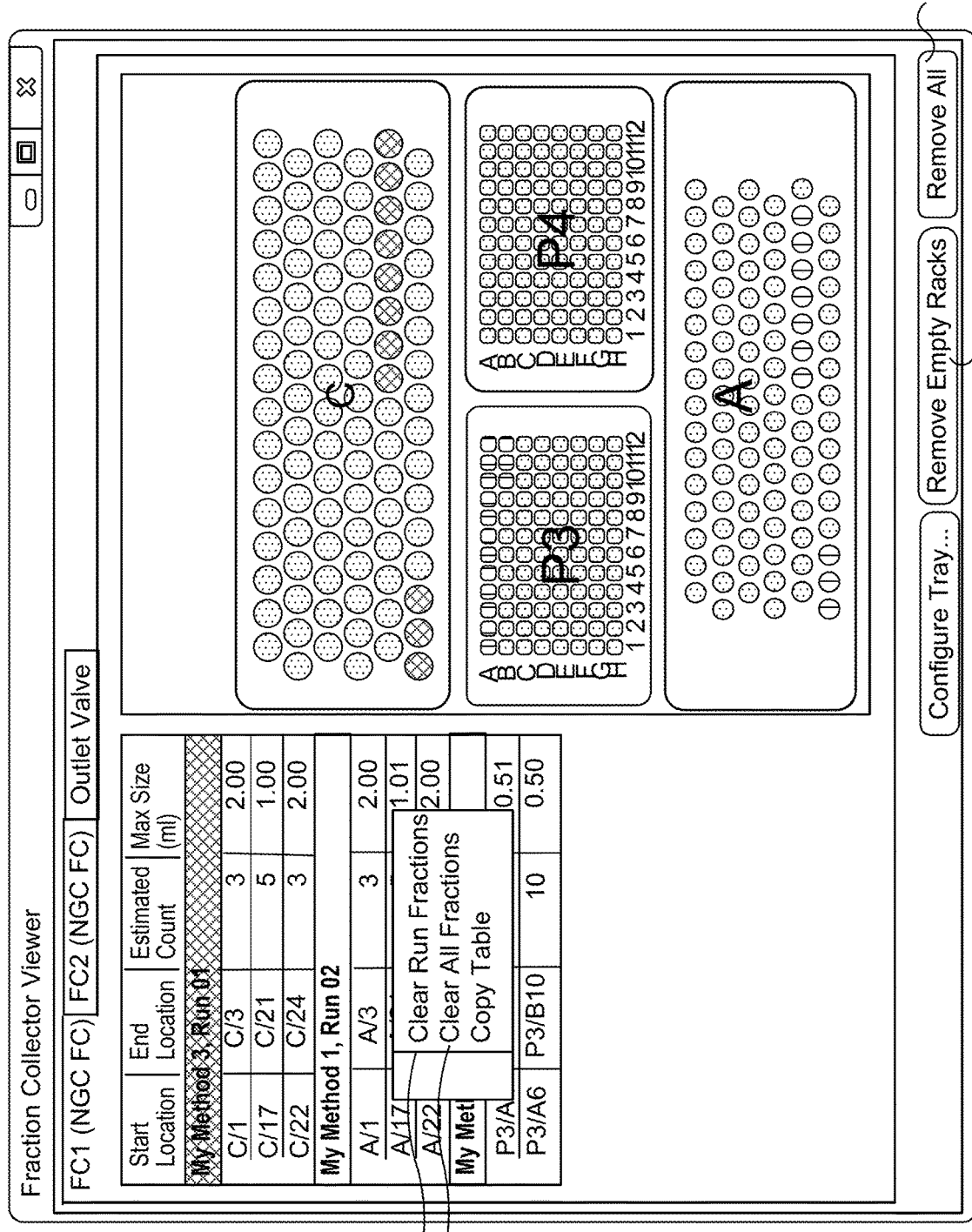

In the embodiment shown in FIG. 6A, when a user checks the "Start Run with Empty Tray" check box 672, this is treated as confirmation by the user that all tubes for a previous run have been removed and it is safe to reschedule the fraction collector tray. This action permits the scheduler to allow new runs to occupy rack space used previously by the completed runs. FIG. 6E depicts another embodiment of how one might unschedule individual runs or groups of runs as well as clear racks. In the embodiment shown, clicking on a single run and selecting "Clear Run Fractions" 601 clears the selected run fractions. Selecting "Clear All Fractions" 602 clears fractions for all completed runs. Pressing the button "Remove All" 603 removes the fractions and racks for all completed runs. Pressing the button "Remove Empty Racks" 604 removes the racks from which tubes have been cleared. In another embodiment, a mouse may be used to click on the tubes on the rack image to select and delete them. This option makes it visually obvious which tubes are being cleared.

Referring back to FIG. 4, the run-control module 430 interfaces with the fraction collector(s) 120 to implement the runs scheduled using the user interface module 420. In one embodiment, the run-control module 430 sends run information to the control module 320 of the fraction collector(s) 120 via the network 140. The run information identifies the group of tubes reserved for the run (e.g., an identifier if the first tube in the group and the number of tubes in the group) along with the conditions under which collection should begin (e.g., an optical density threshold, etc.). The fraction collector(s) 120 then interact directly with the sensors on the columns 110 (e.g., via network 140) to determine when collection should begin. In another embodiment, the run-control module 430 interacts with the sensors on the columns 110 and sends specific instructions to the fraction collector(s). For example, once the threshold conditions for a run are met, the run control module 430 might instruct a first fraction collector (via the network 140) to begin collection from the corresponding column 110 in the first tube of rack B. In other embodiments, the scheduling function is distributed in other ways between the run-control module 430 and the control module 320.

The control data storage 440 includes one or more computer-readable storage media that store the data used in run-scheduling. For example, various embodiments provide functionality enabling users to save the parameters of experiments so they can be easily repeated, save the reports generated by previous experiments, and the like. The control data storage 440 may also hold system information, such as the types of racks currently installed in the fraction collectors 120, current tube assignments and the corresponding users, and the number of tubes actually used in runs for which the number of required tubes was estimated. This last type of data can be used to improve future predictions for the number of tubes required by similar experiments. In one embodiment, the control data storage 440 is a hard drive within the control system 130. In other embodiments, the predictive model store 440 is located elsewhere, such as at a cloud storage facility.

Computing System Architecture

Figure 7:
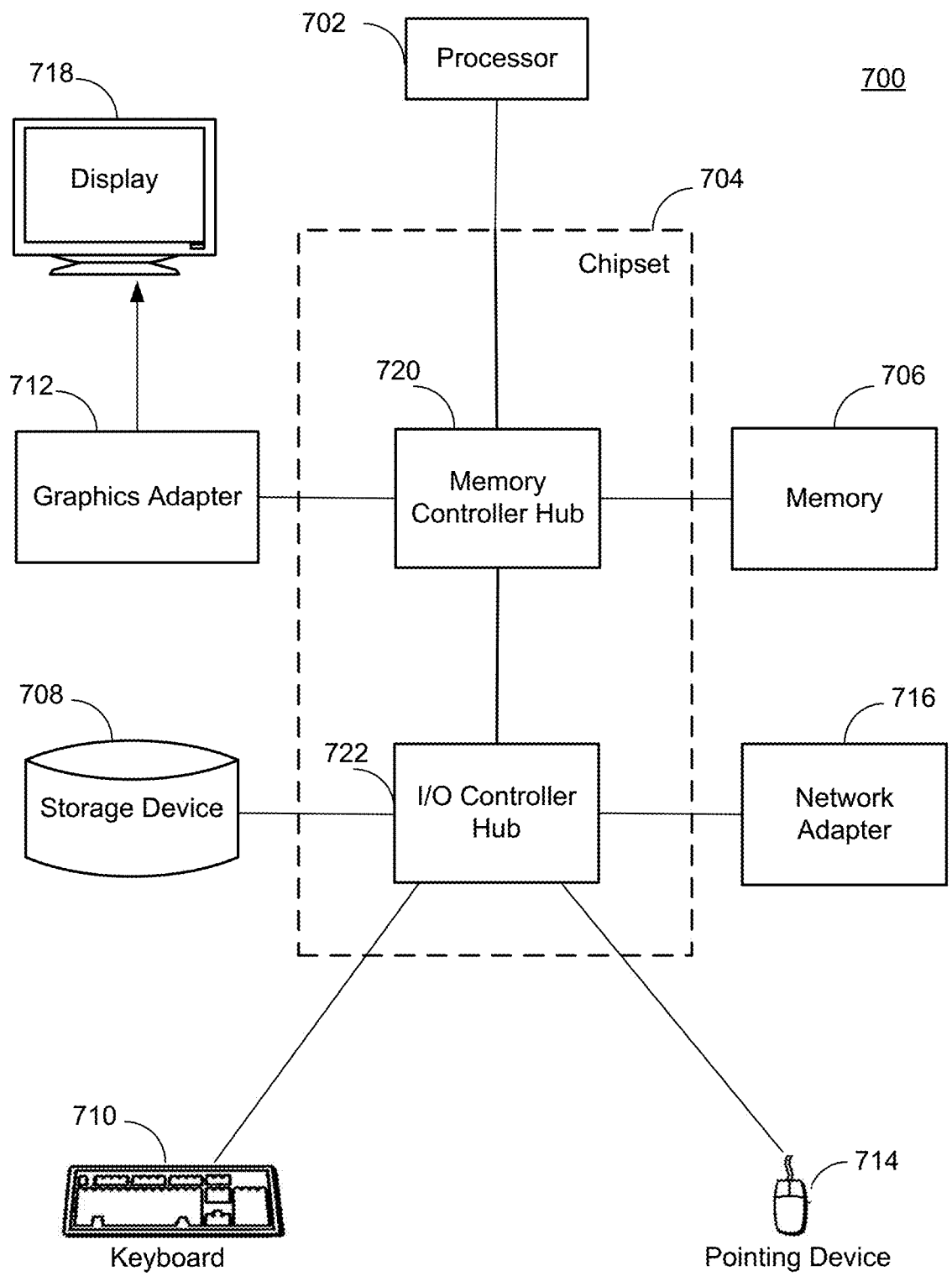
FIG. 7 is a high-level block diagram illustrating a computer system suitable for use in the system of FIG. 1, according to one embodiment.

FIG. 7 is a high-level block diagram illustrating an example computer 700 (e.g., suitable for use as the control system 130), according to one embodiment. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, or other type of pointing device, and is used in combination with the keyboard 710 to input data into the computer system 700. The graphics adapter 712 displays images and other information on the display 718. The network adapter 716 couples the computer system 700 to one or more computer networks, such as network 140.

The types of computers used by the entities of the fraction collection system can vary depending upon the embodiment and the processing power required by the entity. Furthermore, the computers can lack some of the components described above, such as keyboards 710, graphics adapters 712, and displays 718. For example, the control module 320 of a fraction collector 120 might be implemented as a dedicated chipset and lack a display 718, keyboard 710, pointing device 714, or other components illustrated in FIG. 7.

Examples of Methods

Figure 8:
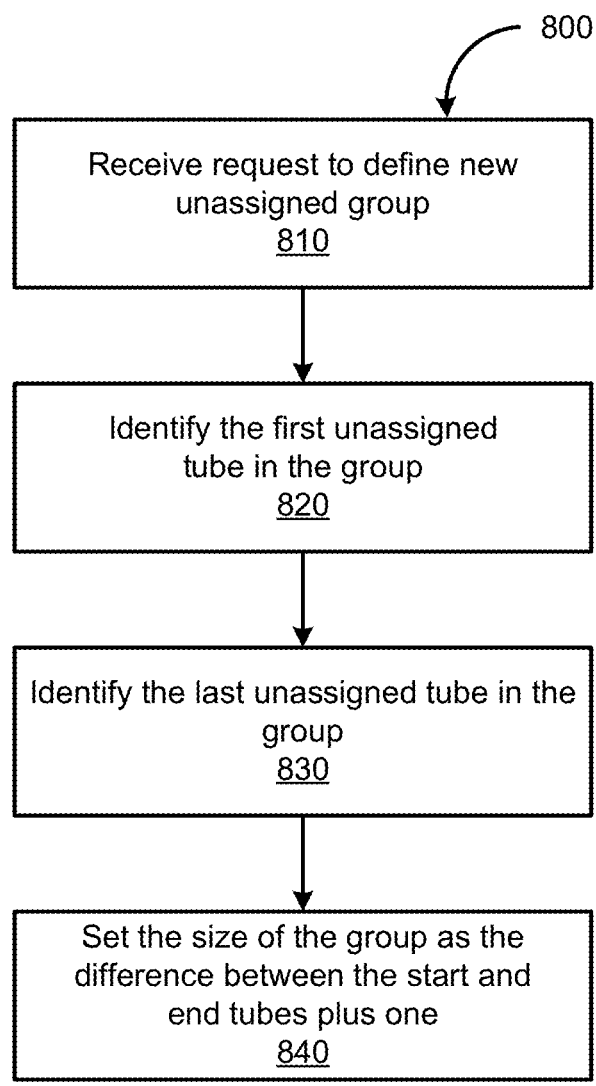
FIG. 8 is a flow chart illustrating an example method for defining groups of contiguous unassigned tubes, according to one embodiment.

FIG. 8 illustrates an example method 800 for defining a set of contiguous unassigned tubes as an unassigned group, according to one embodiment. The steps of FIG. 8 are illustrated from the perspective of the control system 130 performing the method 800. However, some or all of the steps may be performed by other entities and/or components. In addition, some embodiments may perform the steps in parallel, perform the steps in different orders, or perform different steps. For example, in embodiments where the availability of each tube is explicitly stored individually, the method 800 might not include setting the size of the group.

In the embodiment shown in FIG. 8, the method 800 begins with the control system 130 receiving 810 a request to define a new unassigned group. Typically, the request will be generated automatically by the control system 130 in response to other actions taken by the user (e.g., cancelling a run or marking it is complete). However, in some instances, the new group can be requested directly by a user (e.g., by a system administrator overriding an error causing tubes to remain assigned erroneously). Regardless of how it is generated, the request includes information regarding why the new group is being created. For example, if the request is generated because a range of tubes have been freed by a user, the request identifies the newly freed range. As described, depending on the specific embodiment, the range can be identified by the end points, the start point and the total number of tubes, an identifier of each individual tube in the range, or any other appropriate method.

The control system 130 identifies 820 the first unassigned tube for the new group. In one embodiment, where the request identifies a newly-freed range, the control system 130 starts at the beginning of that range and examines the tube assignments to determine whether it is immediately preceded by an existing range of unassigned tubes. If so, the newly-freed range is merged with the existing unassigned range, with the first tube in the new group being the first tube of the existing unassigned range. If not, then the first tube of the newly freed range is the first tube of the new unassigned group. In another embodiment, where the availability of tubes is stored individually, the control system 130 steps back through the tubes in the rack (and the preceding rack if it is of the same type and the beginning of the current rack is reached) until an assigned tube is identified. The control system 130 sets the tube immediately after the first assigned tube identified as the first tube of the new unassigned group.

The control system 130 also identifies 830 the last unassigned tube in the group. In one embodiment, where the request identifies a newly-freed range, the control system 130 starts at the end of that range and examines the tube assignments to determine whether it is immediately followed by an existing range of unassigned tubes. If so, the newly-freed range is merged with the existing unassigned range, with the last tube in the new group being the last tube of the existing unassigned range. If not, then the last tube of the newly freed range is the last tube of the new unassigned group. In another embodiment, where the availability of tubes is stored individually, the control system 130 steps forward through the tubes in the rack (and the following rack if it is of the same type and the end of the current rack is reached) until an assigned tube is identified. The control system 130 sets the tube immediately before the first assigned tube identified as the last tube of the new unassigned group.

Figure 9:
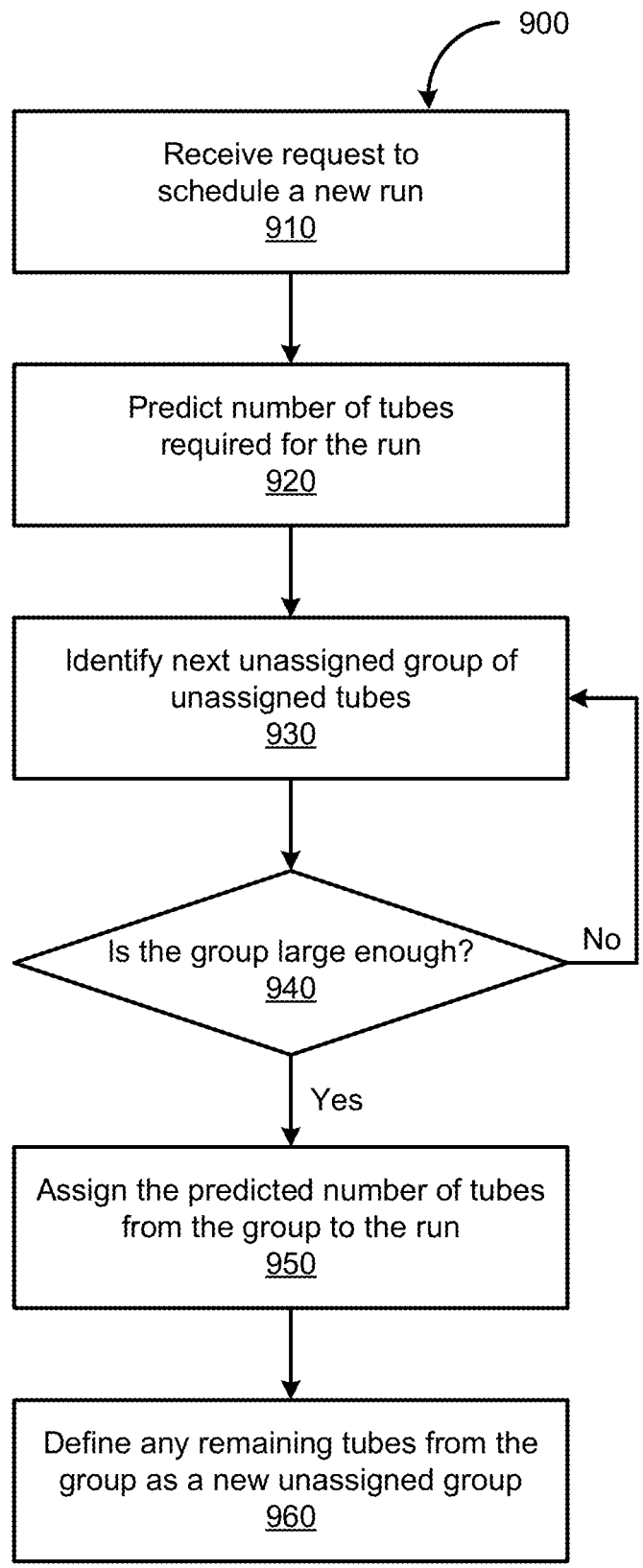
FIG. 9 is a flow chart illustrating an example method for automatically assigning tubes to a run, according to one embodiment.

Having identified the beginning and end points of the new group, the control system 130 sets 840 the size of the group. In one embodiment, the size of the group is stored as the difference between the start and end tubes plus one. In another embodiment, the size is stored implicitly by identifying the first and last tubes in the group. One of skill in the art will recognize other ways in which groups can be defined and stored, and other information that can be stored to identify groups. For example, each group might be stored with an identifier to aid searching FIG. 9 illustrates an example method 900 for automatically assigning tubes to a run, according to one embodiment. The steps of FIG. 9 are illustrated from the perspective of the control system 130 performing the method 900. However, some or all of the steps may be performed by other entities and/or components. In addition, some embodiments may perform the steps in parallel, perform the steps in different orders, or perform different steps. For example, in implementations where the user explicitly provides the number of tubes required, the step of predicting the required number of tubes might be skipped.

In the embodiment shown in FIG. 9, the method 900 begins with the control system 130 receiving 910 a request to schedule a new run. The request includes information about the run, such as the type or types of tube required, the molecule being collected, the solution from which it is being separated, the column or columns 110 being used, and the like. Based on this information, the control system 130 predicts 920 the required number of tubes. As described previously, this prediction 920 may be as simple as looking up a known value in control data storage 440, or it may be an estimate based on previous similar experiments. Furthermore, in some embodiments, the user can override the predicted number by providing an exact number of tubes that should be assigned.

Having determined the number of tubes to be allocated, the control system 130 identifies 930 the next group of unassigned tubes of the required type. In one embodiment, the control system 130 looks to the layer associated with the required tube type. The control system starts at the tube that is currently being used or is next scheduled for use and steps through the tubes of the current rack, and then the next rack, etc, looking for an unassigned group. If no runs are currently scheduled, the control system 130 begins its search at the first tube of the first rack.

Because a layers representation is used, any tubes of a different type will appear unavailable to the control system 130 during this search, so they are not considered. If the control system 130 reaches the end of the last rack without finding an unassigned group, it returns the first tube of the first rack and continues searching. If the control system reaches the current tube (i.e., it has considered every tube of every rack), then it returns an error indicating that there are no unassigned groups of the requested type available. In other embodiments, the control system uses a similar approach but begins the search at different points, such as the first tube if the first rack, or the first tube of the current rack.

Assuming an unassigned group is identified, the control system 130 determines whether it is large enough for the requested run 940. In one embodiment, the control system 130 compares the predicted number of required tubes to the size of the unassigned group and determines the group is large enough if it includes at least the predicted number of tubes. In some embodiments, the control system 130 requires (or includes a user options for requiring) a certain number of "spacer" tubes (e.g., one tube) between the newly scheduled run and other runs. In such embodiments, the unassigned group must be large enough to encompass both the predicted number of tubes and the required number of spacer tubes.

If the group is not large enough, the method 900 loops back and the control system 130 identifies 930 the next unassigned group. This search begins at the end of the unassigned group that was just determined to be too small. Conversely, if the group is determined to be large enough, the control system 130 assigns 950 the predicted number of tubes from the group to the run. In one embodiment, the control system 130 creates a new assigned group for the run including the predicted number of tubes, starting at the first tube of the identified unassigned group. In another embodiment, where one or more spacer tubes are required, the newly assigned group begins that many tubes into the previously unassigned group. Alternatively, the spacer tubes can be added to the predicted number of tubes and included in the newly assigned group. One of skill in the art will recognize various ways in which a portion of the identified unassigned group can be defined as a new group that is assigned to the run.

The control system 130 defines 960 any remaining tubes from the previously unassigned group as a new unassigned group or groups. In the simple case where the group assigned 950 to the run begins at the first tube of the previously unassigned group, the new unassigned group begins immediately after the group assigned to the run and ends at the same tube that the previously unassigned group ended. For example, if the original unassigned group contained ten tubes, and the first six are assigned to the run, the new unassigned group begins at the seventh tube and ends with the tenth. Similarly, if the group assigned to the run began mid-way through the previously unassigned group, a new unassigned group is additionally or alternatively defined 960 before the newly assigned group. In other words, the previously unassigned group is split into three portions: an unassigned group before the newly scheduled run, the newly scheduled run, and an unassigned group after the newly scheduled run. Either of the new unassigned groups can have zero size (and thus not be created) depending on the size of the newly assigned run and the specific rules used for determining where the newly assigned group begins.

Figure 10:
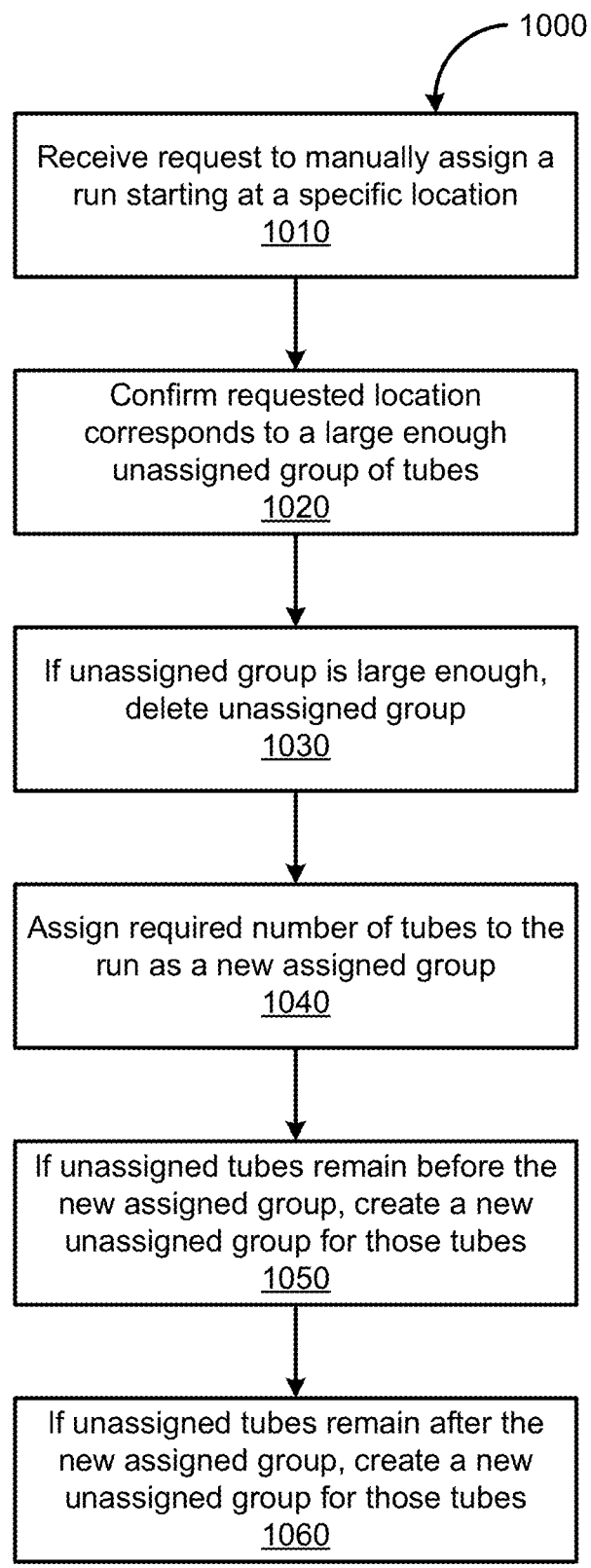
FIG. 10 is a flow chart illustrating an example method for manually assigning tubes to a run, according to one embodiment.

FIG. 10 illustrates an example method 1000 for manually assigning tubes to a run, according to one embodiment. The steps of FIG. 10 are illustrated from the perspective of the control system 130 performing the method 1000. However, some or all of the steps may be performed by other entities and/or components. In addition, some embodiments may perform the steps in parallel, perform the steps in different orders, or perform different steps.

In the embodiment shown in FIG. 10, the method 1000 begins with the control system 130 receiving 1010 a request to manually assign a run. The request includes a specific location at which the user wants the run to begin (e.g., Rack B, tube 12). The request also includes the predicted (or known/requested) number of tubes required for the run.

The control system 130 confirms 1020 that the requested location corresponds to a large enough group of unassigned tubes for the run. In various embodiments, the control system first checks that the requested start location corresponds to a free tube. For example, the control system 130 compares the requested start location to the current unassigned groups to determine whether that location is within an unassigned range. If the start location corresponds to an unassigned tube, the control system 130 determines whether there are enough consecutive unassigned tubes after the start location to assign the whole run. If so, the requested allocation is valid. In one embodiment, if either the start location is already assigned or it is not followed by enough free tubes, the control system 130 returns an error and notifies the user that the requested allocation is invalid. In another embodiment, after determining there are not enough unassigned tubes following the requested start location, the control system 130 also considers unassigned tubes preceding the requested start location. If the run can be assigned by moving the start location back (within the same unassigned group), the control system 130 presents this option to the user as a valid allocation.

If a valid allocation is identified, the control system 130 assigns 1040 the required number of tubes to the run. In one embodiment, the run is assigned by creating a new assigned tubes group (e.g., in the control data storage 440) and deleting the unassigned group in which it is being created. The new group starts at the start location and has a size equal to the required number of tubes. In other embodiments, other methods of identifying the group are used, such as identifying each tube in the group or identifying the first and last tubes. In some embodiments, one or more spacer tubes are also included in the new assigned group.

If tubes from the deleted unassigned group exist before the new assigned group (i.e., the new group does not begin at the start of the deleted unassigned group), the control system 130 creates 1050 a new unassigned group containing those tubes. For example, the control system 130 can apply the method shown in FIG. 8 to determine the start tube, end tube, and size of the new unassigned group. Similarly, if tubes from the deleted unassigned group remain after the newly assigned group, the control system 130 creates 1060 a new unassigned group containing those tubes. Thus, the original unassigned group is deleted and replaced with an assigned group for the run, and up to two new unassigned groups.

Figure 11:
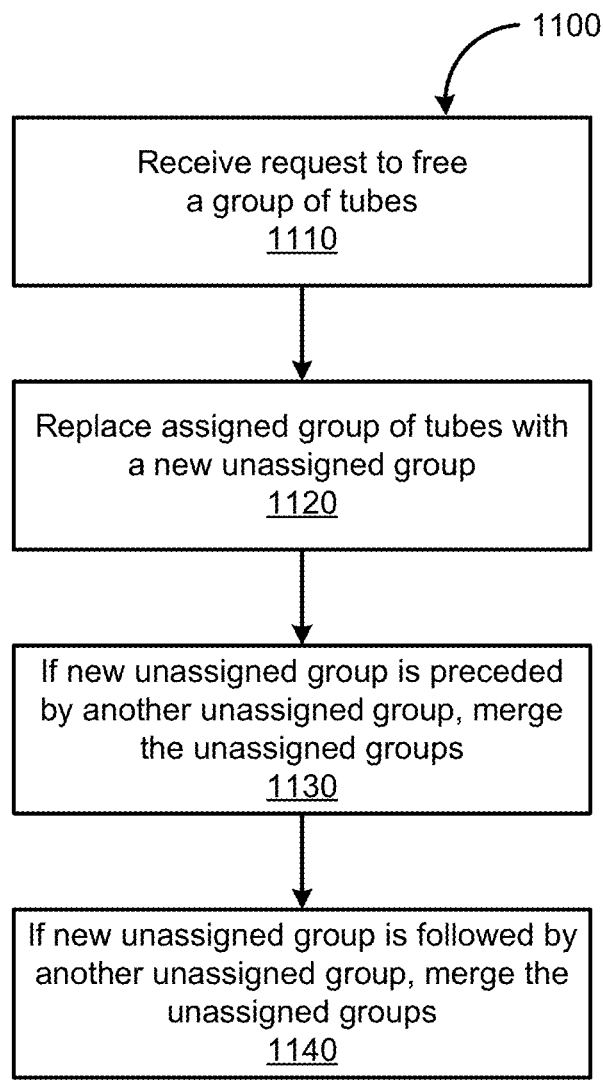
FIG. 11 is a flow chart illustrating an example method for freeing a previously assigned group of tubes, according to one embodiment.

FIG. 11 illustrates an example method 1100 for freeing a previously assigned group of tubes, according to one embodiment. The steps of FIG. 11 are illustrated from the perspective of the control system 130 performing the method 1100. However, some or all of the steps may be performed by other entities and/or components. In addition, some embodiments may perform the steps in parallel, perform the steps in different orders, or perform different steps.

For example, the merging of a newly created unassigned group with preceding and following unassigned groups can be performed in either order.

In the embodiment shown in FIG. 11, the method 1100 begins with the control system 130 receiving 1110 a request to free a group of tubes. In one embodiment, the group to be freed is identified by providing the rack and location of a single tube (e.g., the first tube) in the group. Because the whole group is being freed, only a single tube in the group is needed to identify the whole group. In other embodiments, the group is identified in the similar manner as when it was created (e.g., first tube and size, first tube and last tube, etc.). In yet another embodiment, where group identifiers are stored, the group to be freed is identified by providing the corresponding group identifier in the request.

Assuming the request corresponds to a valid group (i.e., the request identifies a current assigned group), the control system 130 replaces 1120 the assigned group with a new unassigned group. If the new unassigned group is immediately preceded by another unassigned group, the two unassigned groups are merged 1130. Similarly, if the new unassigned group is immediately followed by another unassigned group, these two unassigned groups are also merged 1140. Thus, the deletion of the assigned group does not result in adjacent unassigned groups. Rather, a single, larger unassigned group results, making later scheduling of long runs easier, and more efficient, because less groups have to be considered.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for scheduling fraction collection. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein. The scope of the invention is to be limited only by the following claims.

The invention claimed is:

1. A fraction collection system comprising:
one or more chromatography columns;
one or more fraction collectors configured to collect effluent from the one or more chromatography columns, each fraction collector including a plurality of racks, each rack holding a plurality of collection receptacles; and
a control system, communicatively coupled to the one or more fraction collectors, the control system configured to:
provide a run-scheduling interface comprising:
a visualization area configured to display a graphical representation of the one or more fraction collectors, the graphical representation including a plurality of first geometric shapes corresponding to the plurality of racks, each of the plurality of first geometric shapes encompassing a plurality of second geometric shapes representing the corresponding plurality of collection receptacles; and
user controls for scheduling a run to a subset of the collection receptacles, a visual attribute of those of the second geometric shapes that correspond to the subset of the collection receptacles being updated responsive to the scheduling of the run; and
schedule a run based on user input from the run-scheduling interface, wherein the control system being configured to schedule a run comprises being configured to:
receive a request to schedule the run via the user interface, the request including a volume of input solution and one or more molecules to be collected;
predict a number of collection receptacles required for the run based on the volume of input solution and the one or more molecules to be collected;
identify a group of contiguous collection receptacles sufficient for the run based on the predicted number of collection receptacles; and select the group of contiguous collection receptacles as the subset of the collection receptacles to which the run is scheduled.

2. The fraction collection system of claim 1, wherein a total number of the one or more chromatography columns is greater than a total number of the one or more fraction collectors, and each of the one or more fraction collectors is configured to collect effluent from any one of the one or more fraction collectors.

3. The fraction collection system of claim 1, wherein the one or more fraction collectors comprises a plurality of fraction collectors.

4. The fraction collection system of claim 1, wherein at least one of the racks holds collection receptacles selected from a group consisting of: 13-mm tubes, 16-mm tubes, 18-mm tubes, 50-ml tubes, 24-wells, 48-wells, 96-wells, and 250-ml bottles.

5. The fraction collection system of claim 1, wherein the first geometric shapes are substantially rectangular.

6. The fraction collection system of claim 1, wherein the second geometric shapes encompassed in at least one of the plurality of first geometric shapes are substantially circular.

7. The fraction collection system of claim 1, wherein the second geometric shapes encompassed in at least one of the plurality of first geometric shapes are substantially rectangular.

8. The fraction collection system of claim 1, wherein updating the visual attribute comprises changing a color of those of the second geometric shapes that correspond to the subset of the collection receptacles that are assigned to the run from a first color to one or more additional colors, the first color indicating the corresponding collection receptacle is available for assignment and the one or more additional colors indicating the collection receptacle is unavailable.

9. The fraction collection system of claim 1, wherein the control system being configured to schedule a run further comprises being configured to:
  present the predicted number of collection receptacles to the user;
  provide user interface controls to enable the user to provide an alternate number of collection receptacles; and
  update the predicted number of collection receptacles responsive to user input indicating a number of collection receptacles required.

10. The fraction collection system of claim 1, wherein the control system being configured to identify the group of contiguous collection receptacles sufficient for the run comprises:
  identify a first unassigned group of unassigned collection receptacles after a current collection receptacle;
  determine if the first unassigned group is large enough for the run based on the predicted number of collection receptacles; and
  responsive to the first unassigned group being large enough for the run, assign the run to the first unassigned group.

11. The fraction collection system of claim 10, wherein the control system being configured to identify the group of contiguous collection receptacles sufficient for the run further comprises:
  responsive to the first unassigned group not being large enough for the run, identify a second unassigned group of unassigned collection receptacles after the first unassigned group;
  determine if the second unassigned group is large enough for the run based on the predicted number of collection receptacles; and
  responsive to the second unassigned group being large enough for the run, assign the run to the second unassigned group.

12. The fraction collection system of claim 10, wherein the control system being configured to assign the run to the first unassigned group comprises:
  assign a first subset of the first unassigned group to the run, a number of collection receptacles in the first subset based on the predicted number of collection receptacles; and
  assign a second subset of the first unassigned group as a new unassigned group.

13. The fraction collection system of claim 12, wherein the number of collection receptacles in the first subset is equal to the predicted number of collection receptacles plus two.

14. The fraction collection system of claim 1, wherein predicting the number of collection receptacles required for the run is further based on results of similar previous experiments.

15. A method for scheduling runs in a fraction collection system, the method comprising:
  providing one or more chromatography columns;
  providing one or more fraction collectors configured to collect effluent from the one or more chromatography columns, each fraction collector including a plurality of racks, each rack holding a plurality of collection receptacles;
  displaying a graphical representation of the one or more fraction collectors, the graphical representation including a plurality of first geometric shapes corresponding to the plurality of racks of the one or more fraction collectors, each of the plurality of first geometric shapes encompassing a plurality of second geometric shapes representing a corresponding plurality of collection receptacles;
  displaying user controls for scheduling a run to a subset of the collection receptacles;
  receiving a request to schedule the run via the user interface, the request including a volume of input solution and one or more molecules to be collected;
  predicting a subset of the collection receptacles for the run based on the volume of input solution and the one or more molecules to be collected;
  identify a group of contiguous collection receptacles sufficient for the run based on the predicted number of collection receptacles;
  selecting the group of contiguous collection receptacles as the subset of the collection receptacles to which the run is scheduled;
  updating a visual attribute of those of the second geometric shapes that correspond to the subset of the collection receptacles; and
  performing chromatography using the one or more chromatography columns and collecting the effluent from the one or more chromatography columns in the subset of the collection receptacles.

16. The method of claim 15, wherein predicting the number of collection receptacles required for the run is further based on results of similar previous experiments.

17. The method of claim 15, wherein identifying the subset further comprises:
  presenting the predicted number of collection receptacles to the user;

providing user interface controls to enable the user to provide an alternate number of collection receptacles; and updating the predicted number of collection receptacles responsive to user input indicating a number of collection receptacles required.

18. The method of claim 15, wherein identifying the group of contiguous collection receptacles sufficient for the run comprises:

identifying a first unassigned group of unassigned collection receptacles after a current collection receptacle;

determining if the first unassigned group is large enough for the run based on the predicted number of collection receptacles; and responsive to the first unassigned group being large enough for the run, assigning the run to the first unassigned group.

19. The method of claim 18, wherein identifying the group of contiguous collection receptacles sufficient for the run further comprises:

responsive to the first unassigned group not being large enough for the run, identifying a second unassigned group of unassigned collection receptacles after the first unassigned group;

determining if the second unassigned group is large enough for the run based on the predicted number of collection receptacles; and responsive to the second unassigned group being large enough for the run, assigning the run to the second unassigned group.

20. The method of claim 18, wherein assigning the run to the first unassigned group comprises:

assigning a first subset of the first unassigned group to the run, a number of collection receptacles in the first subset based on the predicted number of collection receptacles; and assigning a second subset of the first unassigned group as a new unassigned group.

\* \* \* \* \*